INVENTOR.
RICHARD F. STEINER
BY
George Sullivan
Agent

INVENTOR.
RICHARD F. STEINER
BY
George C. Sullivan
Agent

March 10, 1964 R. F. STEINER 3,124,722
MULTIPLE CHANNEL PROGRAMMER FOR CONTROLLING A PLURALITY
OF CIRCUIT OPERATIONS IN A PREDETERMINED TIME SEQUENCE
Filed Feb. 10, 1960 3 Sheets-Sheet 3

INVENTOR.
RICHARD F. STEINER
BY
*George C. Sullivan*
Agent

United States Patent Office 3,124,722
Patented Mar. 10, 1964

3,124,722
MULTIPLE CHANNEL PROGRAMMER FOR CONTROLLING A PLURALITY OF CIRCUIT OPERATIONS IN A PREDETERMINED TIME SEQUENCE
Richard F. Steiner, Granada Hills, Calif., assignor to Lockheed Aircraft Corporation, Burbank, Calif.
Filed Feb. 10, 1960, Ser. No. 7,850
1 Claim. (Cl. 317—139)

This invention relates to multiple channel programming and more particularly, to a means of programming a plurality of circuit operations in a predetermined time sequence.

A programming system, that is, a system for producing sequential results has wide applicability in the missile field, recovery systems, pulse repeaters and other related fields. Programming systems are particularly useful for actuation of electrical devices and control systems at predetermined time intervals and in a predetermined sequence of operations.

Previously known programming systems have largely consisted of motor-driven cams, motor-driven sliders and pulse counters. It is apparent that for some applications, the motor-driven programmers are unsatisfactory because of their large size and awkward shape, their inability to withstand high shock and vibration, because they draw a relatively large amount of current or because they are subject to considerable mechanical wear and mechanical defects. Pulse clock counters on the other hand, for some applications, are unsatisfactory because they require a relatively large amount of components which add to cost and unreliability and they interrupt and recycle the sequence of operations with any minute or large interruption of input power. Presently known systems of the electronic type are usually objectionable because of the complicated circuitry, and related expense, because of the large amounts of heat generated and because of the unpredictability of operation or the lack of adaptability to varying circumstances.

Therefore, an object of this invention is to provide a programming system which is subject to little mechanical wear. Another object of this invention is to provide a programming system which utilizes a very few components thereby providing low cost and reliability and which may be packaged in a small volume and with flexible shape.

Another object of this invention is to provide a sequence programming system which prevents the recycling of sequence of operation in the event of power interruption or failure.

A further object of this invention is to provide a programming system which exhibits high accuracy over extreme temperature range, high shock and vibration.

A further object of this invention is to provide an interlocking programming system whereby sequential events cannot vary from their predetermined order.

In accordance with one embodiment of the invention, a condenser is charged through a resistance and the charge controls the conduction point of a transistor which in turn operates a latching type relay. Certain contacts on the relay energize an electrical circuit which may be used to actuate an electrical device or the like. At the same time, other contacts on the relay actuate a second condenser charging circuit to control the conduction of a second transistor circuit which upon operation, energizes a second relay, the contacts of which open the first channel, that is, de-energize the device to which power had been applied previously and start a condenser charging for operation of another channel in sequence. The invention is highly adaptable to various modes of operation and as will be shown, has a wide adaptability in programming systems.

The above and other related objects and advantages of the invention will be apparent from the following description taken in connection with the accompanying drawings in which.

Figure 1:
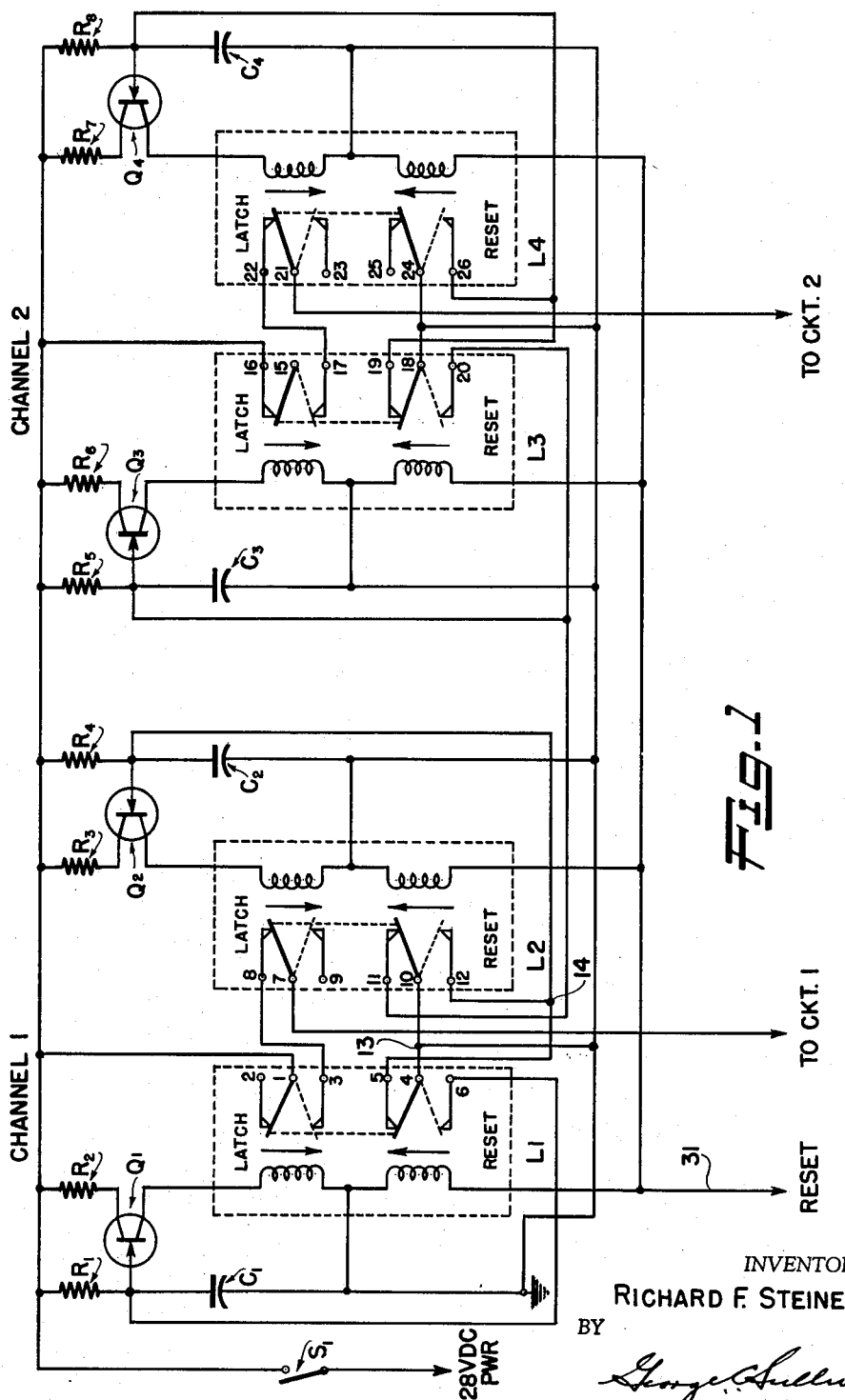
FIG. 1 is a schematic diagram of one embodiment of the invention.

Referring to FIG. 1, a condenser C1 is charged through resistor R1 from the positive D.C. voltage when the switch S1 is closed. The junction between R1 and C1 is connected to the emitter of uni-junction transistor Q1. Resistor R2, transistor Q1 and the coil of latching relay L1 are connected in series between the D.C. power supply and ground potential. Relay L1 is shown in the de-energized condition. The upper armature terminal 1 is connected to the D.C. power supply and the fixed contact 3 associated with the upper armature is connected through terminals 8 and 7 of relay L2 to a circuit or device to be energized and designated in FIG. 1 as circuit 1. The lower armature 4 of relay L1 is connected through junction 13 to ground potential. Latching relay L1 has a latching coil and a reset coil and when energized, latches in the down position and remains in the down position until reset by a current through the reset winding. Fixed contact 5 associated with the lower armature is connected to the junction 14 and fixed contact 6 is connected to the junction between resistance R1 and condenser C1. As shown, junction 13 is connected to the lower armature 10 of relay L2 and junction 14 is connected to terminal 12 of relay L2 and to the junction between resistance R4 and condenser C2. Terminal 11 of relay L2 is connected to the junction between resistance R5 and C3 and to the lower terminal 20 of relay L3.

The similarities of the circuits for transistors Q1, Q2, Q3 and Q4 will be noted and therefore further description is not believed necessary.

With reference to FIG. 1, when switch S1 is closed the condenser charges through resistance R1 with a time constant determined by R1C1 as indicated. When C1 is charged to its peak voltage, uni-junction transistor Q1 conducts, discharging C1 through the latching coil of relay L1, thereby latching both armatures in the down position as indicated by the dotted lines. Normally open contacts 1 and 3 are now closed, thereby closing the circuit between the D.C. power supply through contacts 7 and 8 of relay L2 to circuit 1. The lower armature opens the contact 5 thereby removing the short circuit on condenser C2 and makes contact with terminal 6, thereby shorting condenser C1.

Figure 3:
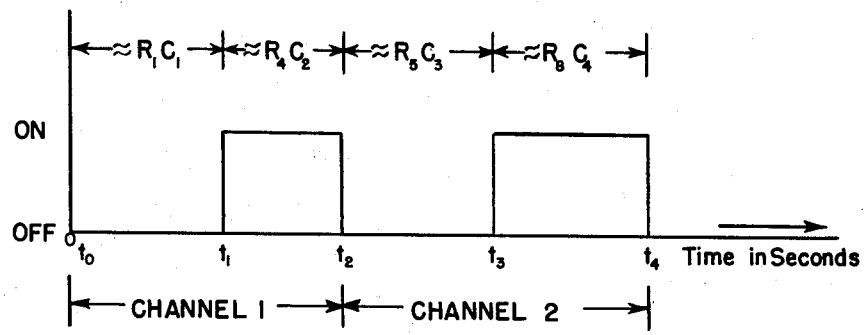
FIG. 3 shows voltage time graphs illustrating the operational aspects of the embodiments shown in FIG. 1.

At time T1 as indicated in FIG. 3 the condenser C2 starts charging through resistor R4. After a time, R4C2, the voltage on C2 causes transistor Q2 to conduct and energizes the latching coil of relay L2. Both armatures of relay L2 are moved to the down position and latched, thereby opening the contacts 7 and 8 and removing power from circuit 1. The lower armature shorts the condenser C2 and at the same time, removes the short from across condenser C3. This time is indicated as T2 in FIG. 3.

The above operation is repeated for channel 2, it being understood that additional circuits may be added for control of channels 3, 4, etc. It will be noted also in the illustrated embodiment that the time in which power is off is determined by the time constant R1C1 or R5C5 and that the time that the power is on is determined by the time constant R4C2 or R8C4 as the case may be. It is also apparent that the time constant in each instance may be varied to thereby obtain a wide range of timing intervals both in the power-on and power-off conditions.

The reset coils of each of the relays are connected in parallel to a common terminal 31. The reset may be operated by the last circuit in the series or by a separate external signal.

Figure 2:
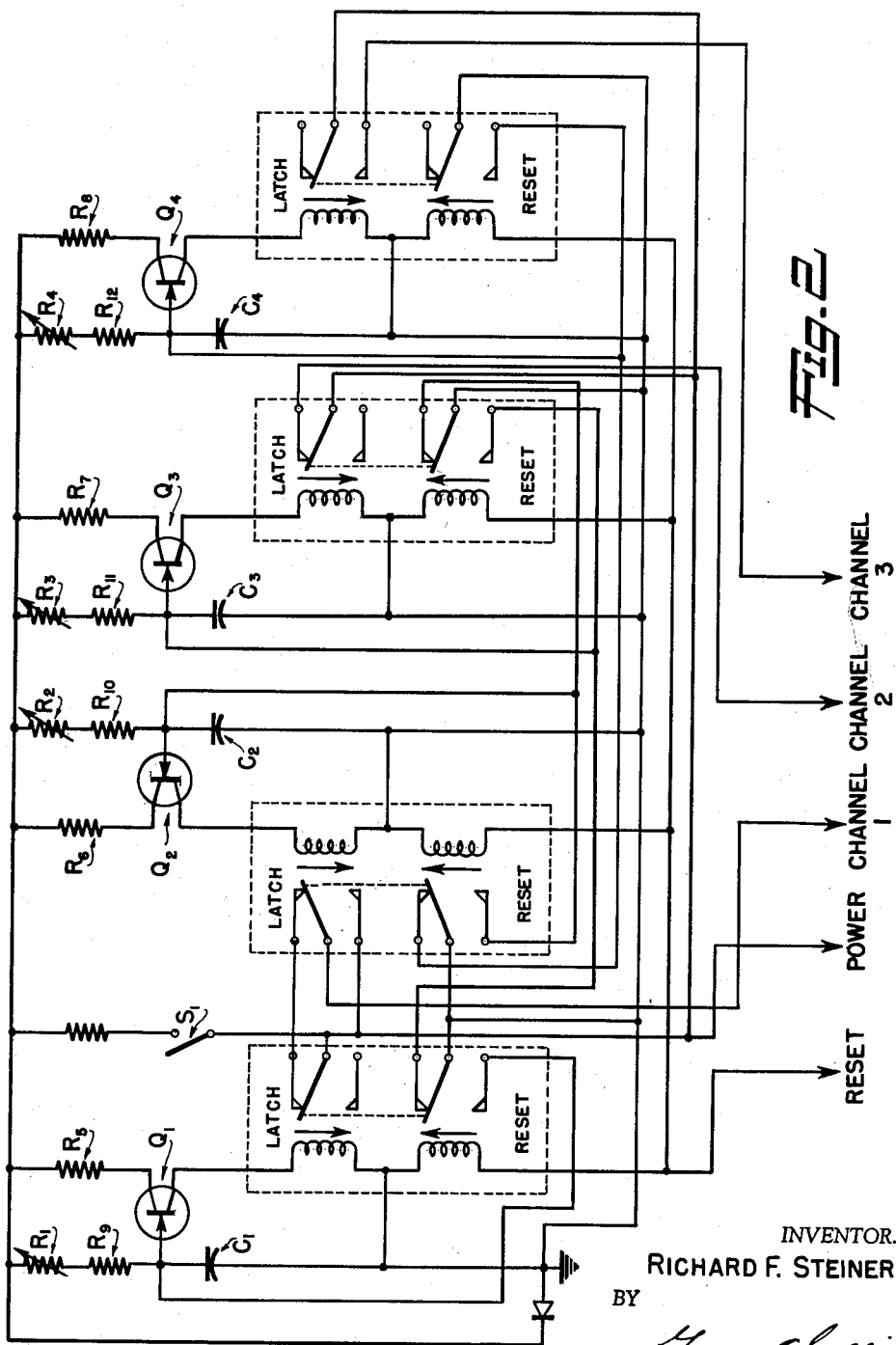
FIG. 2 shows a second embodiment of the invention.
Figure 4:
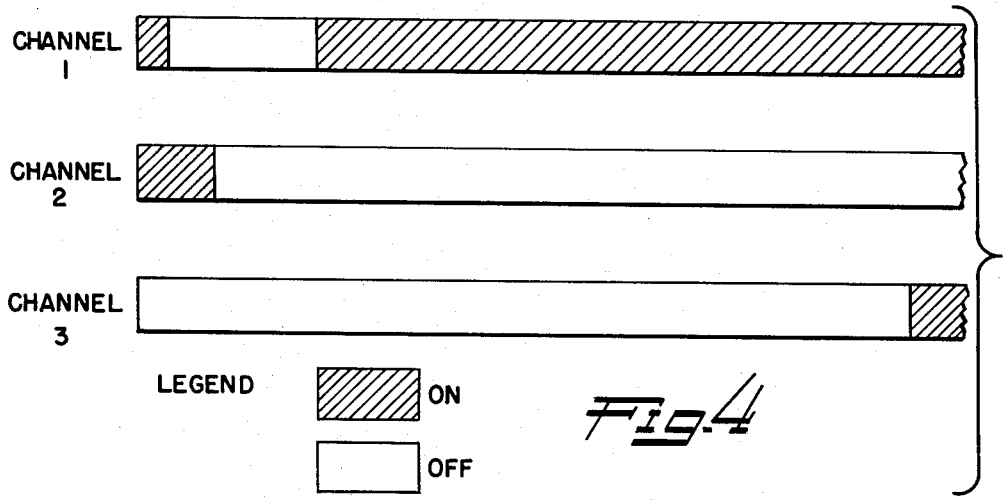
FIG. 4 shows a voltage time graph illustrating the operational aspects of the embodiment shown in FIG. 2.

In FIG. 2, the transistor circuits are similar to those in FIG. 1 but have their relay circuits connected so as to control the power to three separate channels in accordance with the wave forms of FIG. 4. It will be noted that in the de-energized condition, the upper contacts on relays L1 and L2 are closed, thereby providing power to channel number 1. Likewise the upper contact of relay L3 is closed providing power to channel 2. Power is off, however, on channel 3 since the lower contact for the upper armature on relay L4 is open. Following the operation in FIG. 2 after a time delay determined by R1C1, the uni-junction transistor Q1 conducts, energizing relay L1 and moving the armatures to the down latched position. Condenser C1 is shorted. The short is removed from condenser C3 and simultaneously power is removed from channel 1. Condenser C3 begins to charge.

After C3 has charged, the transistor Q3 conducts and latches relay L3 in the down position, removing the power from channel 2, shorting condenser C3 and removing the short circuit from condenser C2. Condenser C2 begins to charge.

When C2 has charged, the transistor Q2 conducts and relay L2 is latched in its down position. Power is restored to channel 1. The condenser C2 is shorted and the short is removed from condenser C4. C4 begins to charge.

When condenser C4 has charged, the transistor Q4 conducts, energizing relay L4 and the armatures are moved to the down position and latched. Power is applied to channel 3 and the condenser C4 is shorted.

It is apparent that the operation of either FIG. 1 or 2 may be repeated by controlling the reset signal from the output of the last transistor circuit. Furthermore, it is believed apparent that additional circuits may be controlled by the simple addition of additional transistors and related circuits. The latching relays provide a positive control over the cycling sequence and prevent a recycling in the event of a momentary power failure. In other words, in the event of a momentary power failure, only that transistor circuit which has its condenser undershorted will begin to operate and the following sequences will take place in their preset order. Likewise, it is believed apparent that the described programmer will follow only the predetermined sequence and no other.

While specific embodiments of the invention have been shown and described, it should be understood that certain alterations, modifications and substitutions may be made to the instant disclosure without departing from the spirit and scope of the invention as defined by the appended claim.

What is claimed is:

A multiple channel programmer comprising a plurality of channels, each channel having a function to be controlled in a predetermined time sequence in relation to the other channels, a plurality of relays each having an unlatched position and latched position, a variable delay means associated with each relay and consisting of a condenser, means for charging said condenser at a variable rate and a transistor responsive to the condenser charge for energizing said relay, each relay having one set of contacts for controlling said channel function and at least another set of contacts for establishing a shorting circuit across the condenser of the succeeding delay means and for breaking a shorting circuit across the condenser of the associated delay means when said relay is in the unlatched position, and for breaking the shorting circuit across the condenser of the succeeding delay means and establishing a shorting circuit across the condenser of the associated delay means when said relay is in the latched position, whereby in the event of power failure only the next succeeding delay means following the last latched relay will be operative when power is restored.

References Cited in the file of this patent

UNITED STATES PATENTS

| | | |
|---|---|---|
| 1,901,663 | Minkler | Mar. 14, 1933 |
| 2,207,055 | Goodling | July 9, 1940 |
| 2,914,710 | Bell | Nov. 24, 1950 |